T. FAWCUS.
GEAR CUTTING MACHINE.
APPLICATION FILED JUNE 14, 1912.
1,067,014.
Patented July 8, 1913.
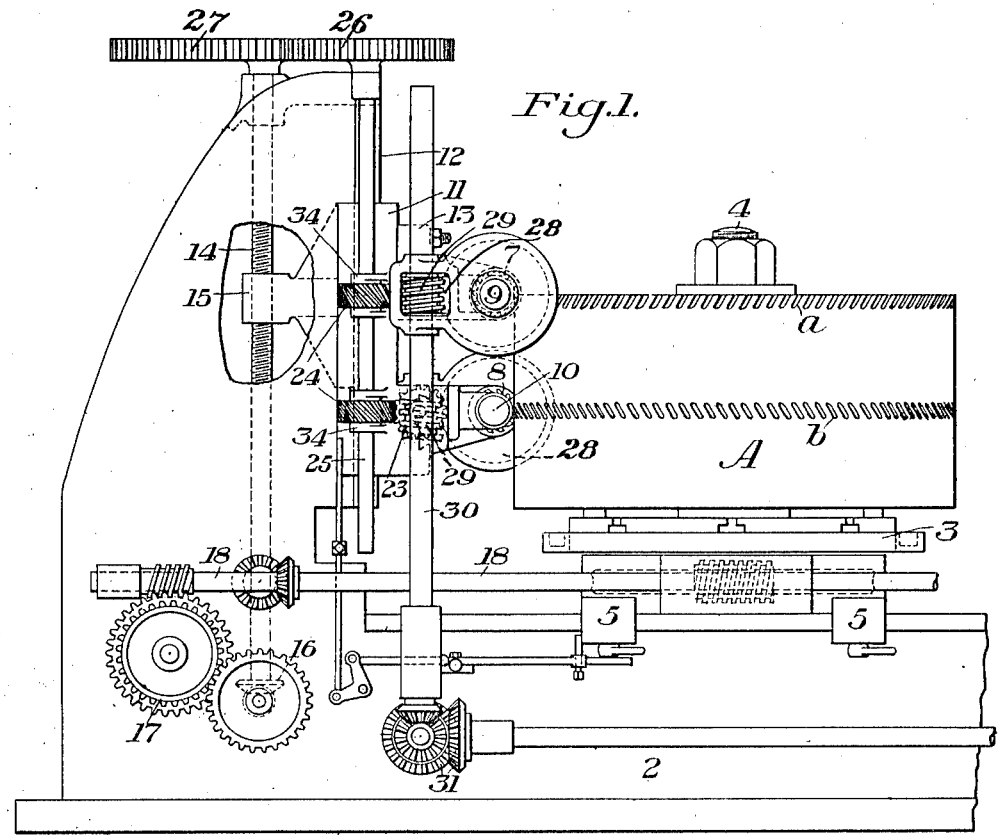
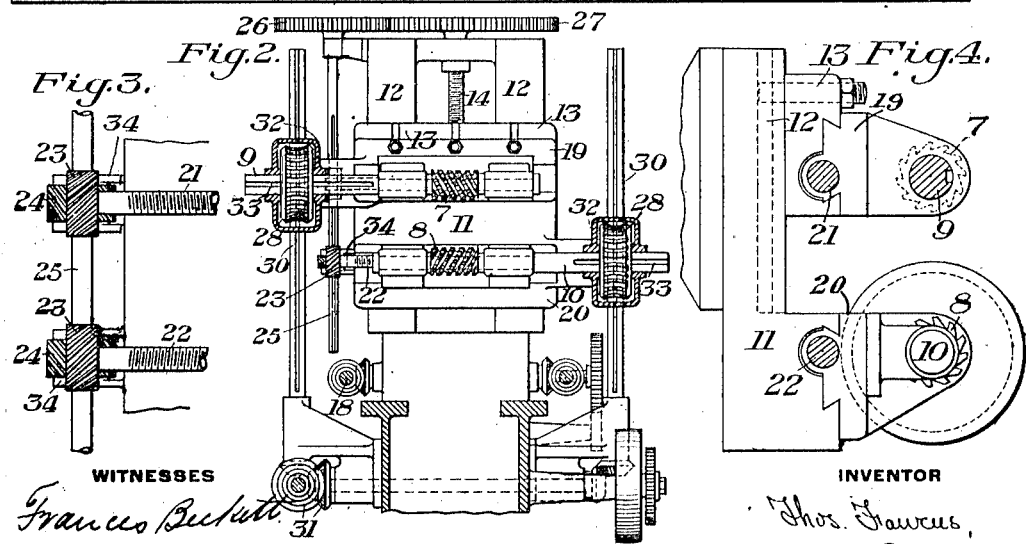
WITNESSES
Frances Beckett
R. A. Balderson
INVENTOR
Thos. Fawcus
by Bakewell, Byrnes, Parmelee
Attys

UNITED STATES PATENT OFFICE.

THOMAS FAWCUS, OF PITTSBURGH, PENNSYLVANIA.

GEAR-CUTTING MACHINE.

1,067,014.  Specification of Letters Patent.  Patented July 8, 1913.

Application filed June 14, 1912. Serial No. 703,721.

*To all whom it may concern:*

Be it known that I, THOMAS FAWCUS, a resident of Pittsburgh, in the county of Allegheny and State of Pennsylvania, have invented a new and useful Improvement in Gear-Cutting Machines, of which the following is a full, clear, and exact description, reference being had to the accompanying drawings, forming part of this specification, in which—

Figure 1 is a side elevation of a portion of a gear-cutting machine embodying my invention; Fig. 2 is a front elevation of a portion of the same; and Figs. 3 and 4 are detail views.

My invention has relation to machines for cutting gears of the type commonly known as "double helical" gears, and more particularly to machines for this purpose of the general type described and claimed in my Patent No. 1,022,667, of April 9, 1912, in which there are two cutting hobs arranged to act simultaneously upon a gear blank, one hob cutting the portions of the double helical gear at one side of the peripheral center of the blank, and the other hob cutting teeth at the opposite side of such center, means being provided for feeding both hobs in the same direction while cutting.

The present invention relates more especially to means of novel character for feeding the hobs or cutters to cause them to produce cuts which are at reverse angles to the axis of the blank in which the cuts are being made.

Referring to the accompanying drawings, the numeral 2 designates the bed frame of a machine; 3 designates a rotary blank-supporting table which is mounted to rotate in a horizontal plane upon the vertical shaft 4, said shaft being mounted in a carriage 5, movable longitudinally on the bed of the machine.

A designates a partially cut blank which I have shown as rigidly secured to the table 3, and which is to have double helical teeth cut thereon. The beginnings of the two sets of teeth are indicated, respectively, at $a$ and $b$. The teeth $a$ extend from the upper edge of the blank to the center line of the periphery and are cut by a rotary hob 7, while the teeth $b$ extend from the lower edge of the blank to the center, and are cut by the hob 8. These hobs may be, in general, of well known character, having helical cutting teeth which mesh with the teeth which they cut in the blank, one of the hobs being made right-handed and the other left-handed and the two hobs being driven in opposite directions. The hob 7 is mounted upon the transverse shaft 9, while the hob 8 is mounted on the transverse shaft 10, these two shafts being journaled one above another in suitable bearings on a vertically movable slide or carrier 11, which works in the vertical ways 12. Provision is also made, by means of a member 13 adjustably mounted on the slide 11, whereby the bearings of the shaft 9 may be adjusted to vary the distance between the centers of the two shafts 9 and 10 to suit different sized gear blanks.

The slide or carrier 11 is given its feed movement by the vertical screw 14, which engages a nut portion 15 on the slide or carrier. 16 designates suitable gearing for actuating the feed screw 14, and 17 indicates suitable gearing for actuating a longitudinal shaft 18, by means of which the blank-supporting table 3 is rotated.

As thus far described, the machine does not differ essentially from that shown and described in my patent above referred to and to which reference may be had for a more complete description of the gearing and other operating parts. In cutting the double helical gears, it is apparent that the cutters must be in some way affected relatively to the blank, in order that the teeth $a$ and $b$ may be cut at the proper reverse angles. The means specifically described for this purpose in my said patent consisted of a differential gearing whereby one of the hobs is driven at a speed relatively slower than that of the blank, while the other hob is driven at a speed relatively greater than that of the blank. The present invention does away with the use of differential gearing or other gearing of a nature to change the speed of the hobs relatively to that of the blank, and substitutes for such gearing means of simple character whereby the hobs are moved endwise in reverse directions during the cutting operation. To that end, the bearings for the hob shafts are mounted in the horizontal slides 19 and 20. The slide 19 is mounted in the member 13, while the slide 20 is mounted in the slide 11. Each of these slides 19 and 20 has a nut portion, and these nut portions are engaged by the threaded shafts 21 and 22, respectively, these two shafts having threads of opposite hand, as shown in Fig. 3. Secured to the end of each of these shafts is a spiral gear 23, each of these spiral gears meshing with a corresponding gear 24, which is mounted to slide vertically on a driving shaft 25. The gears 24 have a spline and groove connection with shaft 25, so that as they are moved vertically thereon, they will be rotated, said shaft being driven by a gear wheel 26, at its upper end, which meshes with a gear wheel 27 on the screw shaft 14.

It will be apparent that as the slide 11 is fed by the action of the screw shaft 14, the threaded shafts 21 and 22 will be rotated through the gears 23 and 24 and the slides 19 and 20 will be moved endwise in reverse directions, thereby causing the hobs or cutters to be moved endwise in opposite directions to effect the desired angularity of the teeth $a$ and $b$. By changing the ratio of the gears 26 and 27, the degree of angularity of the teeth can be readily changed.

Each hob shaft 9 and 10 is driven by a worm wheel 28, which meshes with a worm 29, on a vertical shaft 30. There are two of these vertical shafts, one at each side of the machine and driven through suitable gearing 31, which may be arranged as in my patent above referred to, the shafts 30 of the present application corresponding to the shafts 18 and 21 of the said patent. By reason of the vertical feed movement of the slide 11, it is necessary to make the worms 29 movable on the shafts 30, and to this end, they are provided with a key-and-groove connection with the shafts 30 and are engaged by brackets 32, carried by the slide 11, so that the worms will be moved in unison with said slide. It is also necessary to provide for transverse movement of the hob shafts, relatively to the worms 29, and this is effected by spline-and-groove connections 33 between the worms 28 and said shafts. The vertical movement of the spiral gears 24 on the shaft 25 is effected by the brackets 34, the lower bracket is carried by the slide 11, and the upper bracket by the member 13, so that all of the parts carried by the member 13 will be moved when the cutters are adjusted toward or from each other.

The operation is substantially the same as in the machine of my said patent. That is to say, the gear blank having been secured in place on the table 3 and the hobs 7 and 8 adjusted to a distance apart about equal to one-half the width of face of the gear to be cut, the machine is set in motion, thereby causing the hobs and the blank to revolve at their relative speeds, that is, at the ratio which the number of threads in the hobs bears to the number of teeth to be cut in the blank. The blank is now moved forward in cutting relation to the hobs, this forward movement of the carriage 5 continuing until the required depth of cut is reached. The upper hob 7 is set to cut slightly below its center line on the edge of the blank, and the hob 8 to cut approximately at the peripheral center of the blank. When the blank has been thus fed and the cutting operation has progressed until the required depth of cut is reached, the feed screw 14 is thrown into operation, thereby simultaneously feeding both hobs or cutters downwardly, and through the gearing described, effecting a slow reverse endwise movement of the two hob shafts and hobs as the cutting proceeds.

The advantages of my invention consist mainly in the fact that it eliminates the use of differential gearing, thereby not only greatly simplifying the machine and reducing the number of gear wheels required, but also results in more accurate work, due to the fact that the lost motion in the actuating gearing can be largely eliminated.

I do not, of course, limit my invention to use in connection with machines of the specific character described and claimed in my said patent, since it is obviously applicable to all machines of that general type. It will also be obvious that instead of the particular means disclosed for effecting endwise movement of the hob slides, any other suitable gearing may be employed, and that various other changes may be made in the construction and arrangement of the various parts without departing from the spirit and scope of my invention as defined in the appended claims.

I claim:

1. In a machine for cutting double helical gears, a pair of rotary hobs mounted on separate axes and arranged to act upon a continuously revolving gear blank, means for feeding both hobs in the same direction in a line parallel to the axis of the blank, and means for effecting endwise movements of the hobs, substantially as described.

2. In a machine for cutting gears, two hobs revoluble in opposite directions and arranged to act upon a continuously revolving gear blank, means for simultaneously feeding both hobs in the same direction, and gearing whereby the feeding movement effects reverse endwise movements of the two hobs, substantially as described.

3. In a machine for cutting double helical gears, a right-hand and a left-hand hob, and means for revolving said hobs in opposite directions, means for feeding them in the same direction, said hobs being arranged to act simultaneously upon a continuously revolving gear blank, and means for effecting endwise movement of the hobs during their feeding movement, substantially as described.

4. In a machine for forming double helical gears, two rotary cutters, means for feeding said cutters in the same direction, and means for moving them axially in opposite directions while they are cutting, substantially as described.

5. In a machine for forming double helical gears, two rotary cutters, independently movable transverse slides upon which the cutters are mounted, a vertically movable slide in which both of the transverse slides are mounted, feeding means for effecting the vertical movement of said last mentioned slide, and gearing for simultaneously moving the transverse slides, substantially as described.

6. In a machine for cutting double helical gears, a pair of rotary hobs mounted on separate axes and arranged to act upon a continuously revolving gear blank, means for feeding both hobs in the same direction in a line parallel to the axis of the blank, and means for effecting a simultaneous movement of the hobs in a direction at substantially right angles to their first named movement, substantially as described.

7. In a machine for cutting gears, two hobs revoluble in opposite directions and arranged to act upon a continuously acting gear blank, means for feeding both hobs in the same direction, and means for moving the hobs in opposite directions and perpendicularly to their feeding movement, substantially as described.

8. In a machine for cutting double helical gears, a pair of rotary hobs arranged to feed approximately parallel with the axis of the blank being cut, and means for effecting a movement of the hobs in a direction perpendicular to the feeding movement, substantially as described.

In testimony whereof, I have hereunto set my hand.

THOMAS FAWCUS.

Witnesses:
GEO. B. BLEMING,
GEO. H. PARMELEE.